United States Patent [19]
Andraschko et al.

[11] Patent Number: 5,779,962
[45] Date of Patent: Jul. 14, 1998

[54] EXTRUDING THIN MULTIPHASE POLYMER FILMS

[75] Inventors: Warren Steve Andraschko, North Hudson, Wis.; Bruce B. Wilson, Woodbury, Minn.

[73] Assignee: Minnesota Mining and Manufacturing Company, St. Paul, Minn.

[21] Appl. No.: 626,709

[22] Filed: Apr. 1, 1996

[51] Int. Cl.$^6$ .................................................. B29C 47/32
[52] U.S. Cl. ........................ 264/210.1; 264/175; 425/327
[58] Field of Search ......................... 264/1.7, 1.9, 1.6, 264/175, 210.1, 280, 288.4; 425/327, 325, 326.1

[56] References Cited

U.S. PATENT DOCUMENTS

| | | | |
|---|---|---|---|
| 3,176,584 | 4/1965 | De Vries et al. | |
| 3,190,178 | 6/1965 | McKenzie | |
| 3,676,539 | 7/1972 | Fisher | 264/175 |
| 4,025,159 | 5/1977 | McGrath | |
| 4,202,948 | 5/1980 | Peascoe | 525/70 |
| 4,332,437 | 6/1982 | Searight et al. | |
| 4,393,172 | 7/1983 | Lindner et al. | 525/310 |
| 4,438,171 | 3/1984 | Wefer | 428/215 |
| 4,440,825 | 4/1984 | Paddock | 428/318.6 |
| 4,444,840 | 4/1984 | Wefer | 428/339 |
| 4,444,841 | 4/1984 | Wheeler | 428/339 |
| 4,576,860 | 3/1986 | Fink et al. | 428/314.4 |
| 5,066,098 | 11/1991 | Kult et al. | 359/540 |
| 5,070,665 | 12/1991 | Marrin et al. | 52/239 |
| 5,117,304 | 5/1992 | Huang et al. | 359/529 |
| 5,167,894 | 12/1992 | Baumgarten | 425/327 |
| 5,306,548 | 4/1994 | Zabrocki et al. | 428/215 |
| 5,310,436 | 5/1994 | Pricone et al. | 156/209 |

FOREIGN PATENT DOCUMENTS

| | | |
|---|---|---|
| 0 165 075 | 12/1985 | European Pat. Off. . |
| 0 370 347 B1 | 5/1990 | European Pat. Off. . |
| 0 448 953 | 10/1991 | European Pat. Off. . |
| 0 508 173 A1 | 10/1992 | European Pat. Off. . |
| 1 504 266 | 6/1969 | Germany . |
| 42 11 415 A1 | 10/1993 | Germany . |
| 1052550 | 12/1966 | United Kingdom . |

OTHER PUBLICATIONS

A. Priola et al., "Factors Influencing the Adhesion Properties of Radiation Curable Coatings on Different Substrates", *XIII*$^{th}$ International Conference in Organic Coatings Science and Technology, 303–318 (1987).

"Center High Performance Materials For All Seasons", Brochure of Monsanto Plastics, 49 pp. (Undated).

*Primary Examiner*—Mathieu D. Vargot
*Attorney, Agent, or Firm*—Robert H. Jordan

[57] ABSTRACT

Methods of extruding thin multiphase polymer films using a flat film extrusion die closely spaced to a nip to transport and cool the melt from the die to produce thin multiphase polymer films having substantially uniform calipers of about 250 micrometers or less.

13 Claims, 1 Drawing Sheet

EXTRUDING THIN MULTIPHASE POLYMER FILMS

FIELD OF THE INVENTION

The present invention relates to the field of extruded polymer films. More particularly, the present invention relates to methods of extruding thin multiphase polymer films using flat film dies.

BACKGROUND OF THE INVENTION

Multiphase polymer films are useful in many applications due to their unique qualities, which provide toughness, durability and resistance to weathering useful in many applications.

By multiphase polymer, we mean an organic macromolecule that is composed of different species that coalesce into their own separate regions. Each of the regions has its own distinct properties such as glass transition temperature (Tg), gravimetric density, optical density, etc. One such property of a multiphase polymer is one in which the separate phases exhibit different rheological responses to temperature. More specifically, their melt viscosities at common extrusion process temperatures can be distinctly different. Examples of multiphase polymers are disclosed in U.S. Pat. Nos. 4,444,841 (Wheeler), 4,202,948 (Peascoe), and 5,306,548 (Zabrocki et al.).

Although multiphase polymers possess desirable combinations of properties that are useful in film applications, it is difficult to extrude films of multiphase polymers using conventional film extrusion techniques. As used herein, the term "film" means a flat section having a thickness considerably less than its length and width, typically having a nominal thickness of about 0.25 millimeters or less.

Typically, films are extruded as a relatively thick extrudate which is then pulled, or drawn, immediately after exiting the extrusion die to provide a finished film with the desired caliper. That drawing process works well with many materials. Typical ratios for the extrudate thickness versus the finished, or drawn, film caliper lie within a range of about 3:1 to about 10:1.

When, however, the extrudate a multiphase polymer is drawn to the same degree as typical polymer films, the multiphasic nature of the polymer provides a film that does not have a uniform caliper and may, in some instances, result in the formation of voids in the film. This happens because the regions of low viscosity polymers elongate during drawing, while the regions of high viscosity polymers are essentially unchanged.

One approach at providing a film formed of multiphase polymers is described in U.S. Pat. No. 4,444,841 (Wheeler). That reference discloses that multiphase polymer film of 25 to 250 micrometers. Although the reference states that a flat film extrusion die can be used, the only method described to manufacture the films is a blown film process.

Another reference, U.S. Pat. No. 5,306,548 (Zabrocki et al.), describes coextruding a film of a multiphase polymer over a thermoplastic underlayer using a coextrusion process. There is no disclosure, however, of how to extrude the multiphase polymer portion of the film alone, i.e., where the film is not extruded onto a substrate or other support.

As a result, a need exists for methods of extruding thin multiphase polymer films.

SUMMARY OF THE INVENTION

The present invention provides methods of extruding thin multiphase polymer films using a flat film extrusion die that feeds directly into a closely spaced nip to transport and cool the melt from the die to form the film. Methods according to the present invention produce thin multiphase polymer films having substantially uniform calipers of about 250 micrometers or less, more preferably about 100 micrometers or less, and even more preferably about 50 micrometers or less.

The preferred die lip spacing to produce thin multiphase polymer films in methods according to the present invention is about 100 micrometers or less, more preferably about 60 micrometers or less, and even more preferably about 40 micrometers or less. The preferred draw distance, i.e., the distance between the die lips and the nip, is about 11.5 centimeters or less, more preferably about 9 centimeters or less, and even more preferably about 6 centimeters or less.

The multiphase polymers used in methods according to the present invention may comprise multiphase styrenic thermoplastic copolymers. More preferably, the multiphase polymers comprise a thermoplastic polymer selected from the group consisting of ethylene-propylene-nonconjugated diene ternary copolymers grafted with a mixture of styrene and acrylonitrile, styrene-acrylonitrile graft copolymers, acrylonitrile-butadiene-styrene graft copolymers, extractable styrene-acrylonitrile copolymers, and combinations or blends thereof.

The caliper of the multiphase polymer films produced using methods according to the present invention is preferably substantially uniform, more preferably the film caliper varies about ±15% or less in the cross-web direction, and even more preferably, the film caliper varies about ±5% or less in the cross-web direction.

The above and other features of the invention are more fully shown and described in the drawings and detailed description of this invention. It should be understood, however, that the description and drawings (which are not to scale) are for the purposes of illustration only and should not be read in a manner that would unduly limit the scope of this invention.

DETAILED DESCRIPTION OF THE PREFERRED EMBODIMENT

Figure 1:
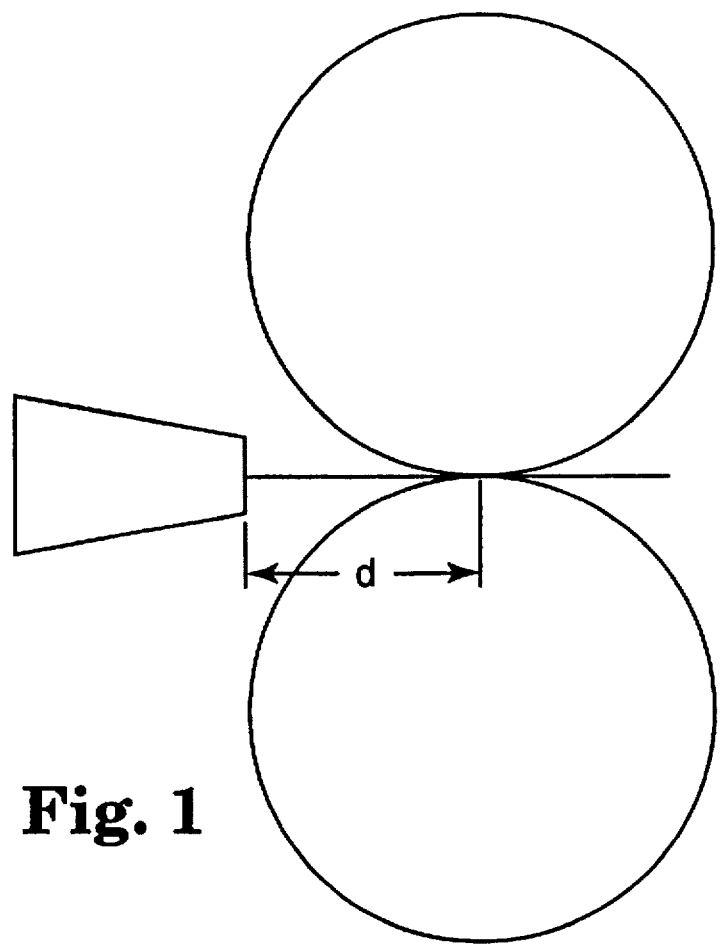
FIG. 1 is a schematic diagram of the die exit to nip roll interface, i.e., the draw distance, in an extrusion system useful according to the present invention.

One particular application in which multiphase polymer films manufactured according to the present invention are useful as a sealing film for the back surface of a cube-corner retroreflective sheetings as described in, for example, U.S. Pat. Nos. 3,190,178 (McKenzie), 4,025,159 (McGrath), 5,066,098 (Kult), and 5,117,304 (Huang). Another retroreflective sheeting with which a multiphase polymer film is particularly useful is described in commonly-assigned, copending U.S. patent application Ser. No. 08/625,857, titled CUBE-CORNER RETROREFLECTIVE SHEETING HAVING A RIVET-LIKE CONNECTION, filed on even day herewith.

In those applications, it is desirable to provide a sealing film comprising a thin multiphase polymer film. For the purposes of the present invention, a thin multiphase polymer film will have a caliper of about 200 micrometers or less, preferably about 100 micrometers or less, and even more preferably about 50 micrometers or less. Thin films are preferred for those applications for a number of reasons. They are typically less expensive because less material is used to manufacture them and they are more flexible because of their smaller caliper. For the retroreflective sheetings described in the application identified in the preceding paragraph, the thin films provide the desired physical properties needed to form the rivet-like bonds discussed therein.

The caliper of the films produced according to the present invention should also be substantially uniform. At a minimum, the film should be free of any voids. More preferably, the film caliper will exhibit caliper variations in the cross-web direction of about ±15% or less of the target caliper, more preferably about ±5% of the target caliper.

One characteristic of a thin multiphase polymer film according to the present invention is that it retains its integrity at temperatures of about 65° C. By this it is meant that the multiphase polymer film can be melted and/or penetrated at localized areas without substantially affecting the integrity of the film adjacent to the melted and/or penetrated areas. The multiphase polymer film also preferably has a ductile yield of at least about 20%, more preferably at least about 50%, prior to ultimate failure (i.e., permanent deformation). Particularly preferred films have a ductile yield of at least about 70% prior to ultimate failure. That is, upon ultimate failure, the thin multiphase polymer film will stretch and remain permanently deformed as a result of the forces generated from stretching. Such thin multiphase polymer films can be referred to as "yielding" films. For comparison, an example of a nonyielding film is a polyethylene terephthalate film.

As used herein, "multiphase" refers to copolymers of immiscible monomers. Examples of thermoplastic polymers suitable for use in extruding multiphase polymer films according to the present invention include, but are not limited to materials from the following classes: multiphase polymers of polyethers, polyesters, or polyamides; oriented syndiotactic polystyrene, polymers of ethylene-propylene-diene monomers ("EPDM"), including ethylenepropylene-nonconjugated diene ternary copolymers grafted with a mixture of styrene and acrylonitrile (also known as acrylonitrile EPDM styrene or "AES"); styrene-acrylonitrile ("SAN") copolymers including graft rubber compositions such as those comprising a crosslinked acrylate rubber substrate (e.g., butyl acrylate) grafted with styrene and acrylonitrile or derivatives thereof (e.g., alphamethyl styrene and methacrylonitrile) known as "ASA" or acrylate-styrene-acrylonitrile copolymers, and those comprising a substrate of butadiene or copolymers of butadiene and styrene or acrylonitrile grafted with styrene or acrylonitrile or derivatives thereof (e.g., alpha-methyl styrene and methacrylonitrile) known as "ABS" or acrylonitrile-butadiene-styrene copolymers, as well as extractable styrene-acrylonitrile copolymers (i.e., nongraft copolymers) also typically referred to as "ABS" polymers; and combinations or blends thereof. As used herein, the term "copolymer" should be understood as including terpolymers, tetrapolymers, etc.

Preferred polymers for use in extruding the multiphase polymer film are within the styrenic family of multiphase copolymer resins (i.e., a multiphase styrenic thermoplastic copolymer) referred to above as AES, ASA, and ABS, and combinations or blends thereof. Such polymers are disclosed in U.S. Pat. Nos. 4,444,841 (Wheeler), 4,202,948 (Peascoe), and 5,306,548 (Zabrocki et al.). The blends may be in the form of a multilayered film where each layer is a different resin, or physical blends of the polymers which are then extruded into a single film. For example, ASA and/or AES resins can be coextruded over ABS. Multiphase AES, ASA, and ABS resins are used in a variety of applications in which they are used alone, together, or in combination with a variety of other resins to make moldable products such as garden furniture, boat hulls, window frames, and automotive body parts, for example.

Particularly preferred polymers for use in the methods according to the present invention are the multiphase AES and ASA resins, and combinations or blends thereof. The AES resins, which contain acrylonitrile, EPDM, and styrene, are particularly desirable because they can adhere to a wide variety of polymer types when melted, such as polycarbonates, polymethylmethacrylates, polystyrene, urethane acrylics, and the like. Commercially available AES and ASA resins, or combinations thereof, include, for example, those available under the trade designations ROVEL from Dow Chemical Company, Midland, Mich., and LORAN S 757 and 797 from BASF Aktiengesellschaft, Ludwigshafen, Fed. Rep. of Germany), CENTREX 833 and 401 from Bayer Plastics, Springfield, Conn., GELOY from General Electric Company, Selkirk, N.Y., VITAX from Hitachi Chemical Company, Tokyo, Japan. It is believed that some commercially available AES and/or ASA materials also have ABS blended therein. Commercially available SAN resins include those available under the trade designation TYRIL from Dow Chemical, Midland, Mich. Commercially available ABS resins include those available under the trade designation CYOLAC such as CYOLAC GPX 3800 from General Electric, Pittsfield, Mass.

The multiphase polymer film can also be prepared from a blend of one or more of the above-listed materials that form a yielding film and one or more thermoplastic polymers that themselves produce nonyielding films (i.e., nonductile films, which can be elastomeric or brittle materials). Examples of such thermoplastic polymers that can be blended with the above-listed yielding materials include, but are not limited to, materials from the following classes: biaxially oriented polyethers; biaxially oriented polyesters; biaxially oriented polyamides; acrylic polymers such as poly(methyl methacrylate); polycarbonates; polyimides; cellulosics such as cellulose acetate, cellulose (acetate-co-butyrate), cellulose nitrate; polyesters such as poly(butylene terephthalate), poly(ethylene terephthalate); fluoropolymers such as poly (chlorofluoroethylene), poly(vinylidene fluoride); polyamides such as poly(caprolactam), poly(amino caproic acid), poly(hexamethylene diamine-coadipic acid), poly(amide-co-imide), and poly(ester-co-imide); polyetherketones; poly (etherimide); polyolefins such as poly(methylpentene); aliphatic and aromatic polyurethanes; poly(phenylene ether); poly(phenylene sulfide); atactic poly(styrene); cast syndiotactic polystyrene; polysulfone; silicone modified polymers (i.e., polymers that contain a small weight percent (less than 10 weight percent) of silicone) such as silicone polyamide and silicone polycarbonate; ionomeric ethylene copolymers such as poly(ethylene-co-methacrylic acid) with sodium or zinc ions, which are available under the trade designations SURLYN-8920 and SURLYN-9910 from E. I. duPont de Nemours, Wilmington, Del.; acid functional polyethylene copolymers such as poly(ethylene-co-acrylic acid) and poly (ethylene-co-methacrylic acid), poly(ethylene-co-maleic acid), and poly(ethylene-co-fumaric acid); fluorine modified polymers such as perfluoropoly(ethyleneterephthalate); and mixtures of the above polymers such as a polyimide and acrylic polymer blend, and a poly(methylmethacrylate) and fluoropolymer blend. Such "nonyielding" thermoplastic polymers can be combined with the yielding thermoplastic polymers in any amount desired, as long as the resultant film preferably has a ductile yield of at least about 20%, and more preferably at least about 50%, prior to ultimate failure. Examples of a combination of a yielding/nonyielding material are polycarbonate/ABS resins such as those available under the trade designations PULSE 1350 and 1370 from Dow Chemical Company, Midland, Mich.

These polymer compositions may include other ingredients including UV stabilizers and antioxidants such as those available from Ciba-Geigy Corp., Ardsley, N.Y., under the trade designation IRGANOX, fillers such as talc, reinforcing agents such as MICA or glass fibers, fire retardants, antistatic agents, mold release agents such as fatty acid esters available under the trade designations LOXIL G-715 or LOXIL G-40 from Henkel Corp., Hoboken, N.J., or WAX E from Hoechst Celanese Corp., Charlotte, N.C. Colorants, such as pigments and dyes, can also be incorporated into the polymer compositions. Examples of colorants include rutile $TiO_2$ pigment available under the trade designation R960 from DuPont de Nemours, Wilmington, Del., iron oxide pigments, carbon black, cadmium sulfide, and copper phthalocyanine. Often, the above-identified polymers are commercially available with one or more of these additives, particularly pigments and stabilizers. Typically, such additives are used in amounts to impart desired characteristics. Preferably, they are used in amounts of about 0.02–20 wt-%, and more preferably about 0.2–10 wt-%, based on the total weight of the polymer composition.

The process of extruding multiphase polymer films at the desired calipers according to the present invention relies on extruding the film through a flat film extrusion die in which the die lips are closely spaced and feeding the melt into a nip roll in close proximity to the opening of the die. The die lip spacing is preferably about 100 micrometers or less "hot", i.e., when the die is at the operating temperature and while the die is empty (i.e., before materials are extruded through it), more preferably about 60 micrometers or less, and even more preferably about 40 micrometers or less. One preferred spacing is about 38 micrometers which is useful in producing a film with a caliper of about 50 micrometers as discussed in the example. All die lip spacings referred to in connection with this invention will be understood as referring to spacings when the die lips are hot.

The die used with the extruder to form the multiphase polymer films according to the present invention should have the ability to produce an extrudate with a relatively small caliper or thickness. In addition, the profile of the die lips should be such that the die can be placed in close proximity to a nip for transferring the extrudate away from the die as well as cooling the extrudate to form the film. It will be understood that the die lip profile and the diameter of the nip rolls will need to be matched to provide the desired spacing. Referring to FIG. 1, it is preferred that the distance from the die lips to the nip rolls, i.e., the draw distance d, be about 11.5 centimeters or less, more preferably about 9 centimeters, and even more preferably about 6 centimeters or less.

Limiting the draw distance d is important to prevent the problems discussed above experienced when extruding thin multiphase polymer films, i.e., non-uniform caliper and/or voids in the film. By closely spacing the die exit point from the nip, the minimal draw used to provide the desired films with uniform calipers can be achieved before the different polymers elongate at significantly different rates based on their different viscosities.

It will be understood that the preferred system will have the appropriate temperature control equipment to maintain the desired temperatures in each portion of the system, e.g., the extruder and die.

Among the system parameters, it is preferred that extruder screw speed, temperatures, die lip opening, and line speed (i.e., nip roll speed) be set or controlled to the values required to produce a film with the desired nominal caliper. The remainder of the parameters will then all typically be functions of those set values. It will, of course, be understood that the values discussed herein are variable depending on the polymers being extruded, the extruder, line speed, the desired film caliper and many other variables and that the ability to extrude a desired multiphase polymer at a desired caliper on a given extrusion system will typically be optimized empirically.

The following non-limiting example is provided as indicative of one process useful for extruding a thin multiphase polymer film using a flat film extrusion die according to the present invention.

EXAMPLE

A multiphase polymer film with a nominal thickness of about 50 micrometers was produced using the preferred extruder, screw and die described below.

A 4.5" single screw extruder, available from Egan, a Division of Davis Standard Corp., Somerville, N.J., with a length to diameter ratio of 32:1 was used to extrude the multiphase polymer. The screw was a single stage screw with a barrier flight and a compression ratio (feed depth/metering depth) of about 3.5:1. The screw terminated in a Mattox mixing head.

The flat film extrusion die was an H40 AUTOFLEX Die, available from Extrusion Dies, Inc. of Chippewa Falls, Wis. The die was coupled with a Model No. 2002 Control System from Measurex (Cupertino, Calif.) to provide feedback control over the die opening as a function of film caliper.

A screen pack was located between the die and the extruder to filter out any solid particles from the extrudate before the die. The screen pack comprised four screens with a 40-120-120-40 mesh configuration.

The take-away mechanism was a two roll driven stack including a steel roll and an elastomeric-coated roll (red rubber of about 40 durometer). The roll diameters were 45.7 centimeters. Both rolls were maintained at a core temperature of about 10° C. That combination of the preferred die and nip rolls produced a draw distance d of about 9 centimeters between the point at which the extrudate exits the die and enters the nip. The nip pressure was held at about $10.3 \times 10^6$ pascals.

Figure 2:
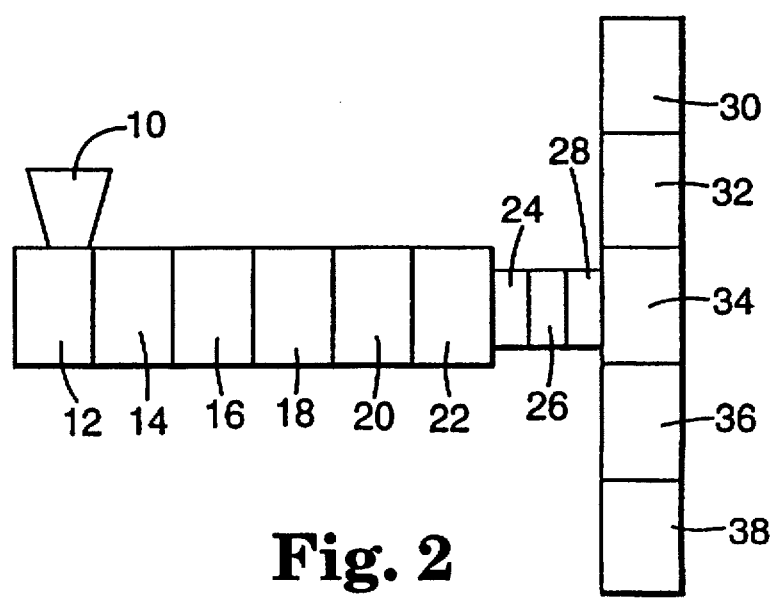
FIG. 2 is a schematic diagram of the extrusion zones used in the example described below.

FIG. 2 is a schematic diagram of the system temperature zones. The zones include a throat 10, first barrel zone 12, second barrel zone 14, third barrel zone 16, fourth barrel zone 18, fifth barrel zone 20 and sixth barrel zone 22. Following the barrel zones is an adaptor zone 24, screen pack body zone 26 and screen pack slide zone 28. After the screen pack zones, the die includes a first die zone 30, second die zone 32, third die zone 34, fourth die zone 36, and fifth die zone 38. The preferred temperatures for each of the zones are listed in the following table (all temperatures are in °C.).

| Zone | Preferred Temp. | Minimum Temp. | Maximum Temp. |
| --- | --- | --- | --- |
| Throat | 54 | 50 | 66 |
| Barrel 1 | 188 | 163 | 195 |

-continued

| Zone | Preferred Temp. | Minimum Temp. | Maximum Temp. |
| --- | --- | --- | --- |
| Barrel 2 | 191 | 171 | 200 |
| Barrel 3 | 207 | 177 | 215 |
| Barrel 4 | 210 | 188 | 232 |
| Barrel 5 | 221 | 213 | 232 |
| Barrel 6 | 221 | 216 | 232 |
| Adaptor | 221 | 216 | 232 |
| Screen Pack Body | 221 | 216 | 232 |
| Screen Pack Slide | 221 | 216 | 232 |
| Die 1 | 221 | 216 | 232 |
| Die 2 | 221 | 216 | 232 |
| Die 3 | 221 | 216 | 232 |
| Die 4 | 221 | 216 | 232 |
| Die 5 | 221 | 216 | 232 |

To avoid moisture problems during extruding, the feed materials, i.e., the polymer pellets, were conditioned in a dryer for at least eight hours at about 66° C. before being deposited into the throat of the extruder.

When producing the preferred film, i.e., a CENTREX 833 polymer, at a feed rate of about 123 kilograms/hour, the nip rolls were driven at a speed of about 28 meters/minute to produce film with a nominal caliper of about 50 micrometers and a width of about 1.37 meters. The die lips were set at an opening of about 38 micrometers hot. At a feed rate of 123 kilograms/hour, the width of the extrudate as it exited the die was about 1.53 meters (before drawn down to a caliper of 50 micrometers). The head pressure when operating under the conditions specified above was typically about $32.4 \times 10^6$ pascals. The screw speed was about 28 revolutions per minute.

The patents, patent documents, and publications cited herein are incorporated by reference in their entirety, as if each were individually incorporated by reference. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of extruding a thin multiphase polymer film comprising:

a) providing a flat film extrusion die having die lips spaced apart by a die lip spacing;

b) providing at least two rolls near the die lips, the rolls forming a nip to transport extrudate away from the die;

c) providing a draw distance between the die lips and the nip of about 11.5 centimeters or less;

d) extruding a multiphase polymer through the die and directly into the nip to provide a film consisting essentially of a multiphase polymer with a substantially uniform caliper of about 250 micrometers or less, wherein the die lip spacing is less than the film caliper.

2. A method according to claim 1, further comprising a step of spacing the die lips apart by a distance of about 100 micrometers or less.

3. A method according to claim 1, further comprising a step of spacing the die lips apart by a distance of about 60 micrometers or less.

4. A method according to claim 1, further comprising a step of spacing the die lips apart by a distance of about 40 micrometers or less.

5. A method according to claim 1, wherein the draw distance is about 9 centimeters or less.

6. A method according to claim 1, wherein the draw distance is about 6 centimeters or less.

7. A method according to claim 1, wherein the multiphase polymer comprises a multiphase styrenic thermoplastic copolymer.

8. A method according to claim 1, wherein the multiphase polymer comprises a thermoplastic polymer selected from the group consisting of ethylene-propylene-nonconjugated diene ternary copolymers grafted with a mixture of styrene and acrylonitrile, styrene-acrylonitrile graft copolymers, acrylonitrile-butadiene-styrene graft copolymers, extractable styrene-acrylonitrile copolymers, and combinations or blends thereof.

9. A method according to claim 1, wherein the step of extruding a multiphase polymer through the die further comprises forming the film with a substantially uniform caliper of about 100 micrometers or less.

10. A method according to claim 1, wherein the step of extruding a multiphase polymer through the die further comprises forming the film with a substantially uniform caliper of about 50 micrometers or less.

11. A method according to claim 1, wherein the film caliper varies about ±15% or less in the cross-web direction.

12. A method according to claim 1, wherein the film caliper varies about ±5% or less in the cross-web direction.

13. A method of extruding a thin multiphase polymer film comprising:

a) providing a flat film extrusion die having a die lip spacing of about 100 micrometers or less;

b) providing at least two rolls near the die lips, the rolls forming a nip to transport extrudate away from the die;

c) providing a draw distance between the die lips and the nip of about 9 centimeters or less;

d) extruding a multiphase polymer through the die and directly into the nip to provide a film consisting essentially of a multiphase polymer with a film caliper of about 100 micrometers or less, wherein the film caliper varies about ±15% or less in the cross-web direction, and further wherein the multiphase polymer comprises a styrenic thermoplastic copolymer, and still further wherein the die lip spacing is less than the film caliper.

* * * * *